United States Patent Office 3,465,227
Patented Sept. 2, 1969

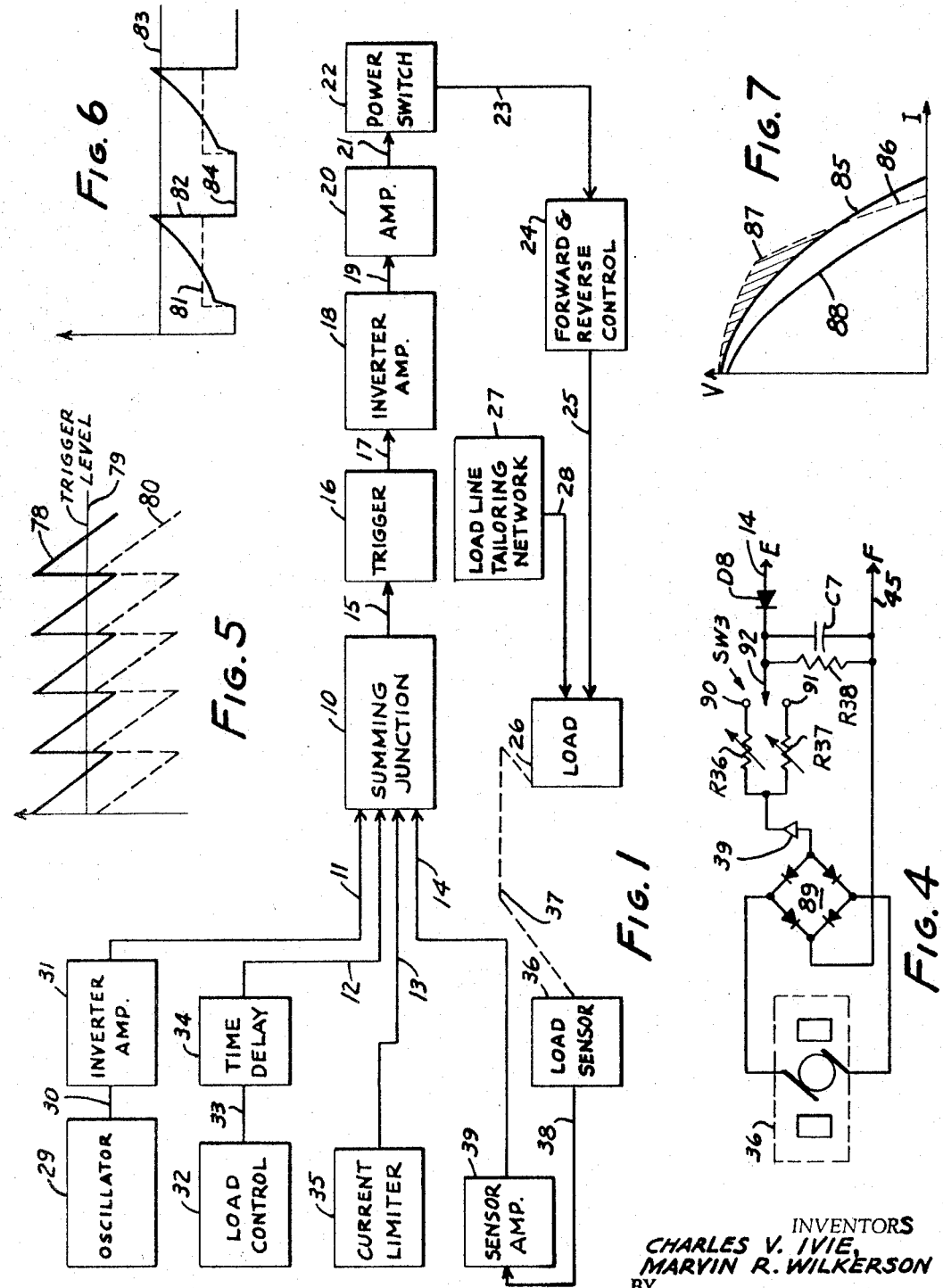

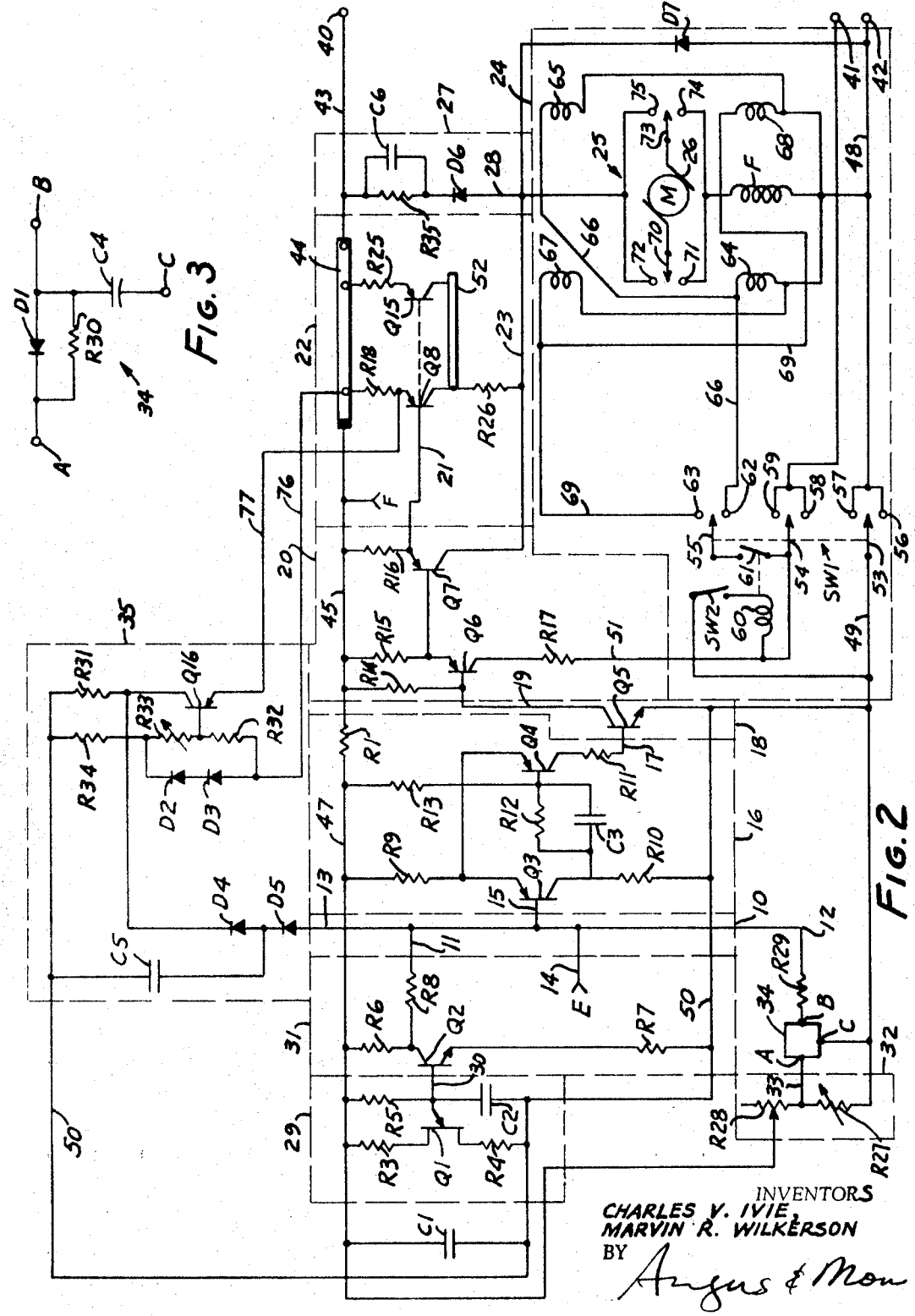

3,465,227
CONTROL SYSTEM FOR A D.C. LOAD HAVING AN ANALOG INPUT
Charles V. Ivie, 1227 S. Concord Lane, Glendora, Calif. 91740, and Marvin R. Wilkerson, 1853 Alta Oaks Drive, Arcadia, Calif. 91006
Filed May 10, 1966, Ser. No. 549,043
Int. Cl. H02p 7/00
U.S. Cl. 318—257                                    12 Claims

ABSTRACT OF THE DISCLOSURE

A control system comprises a summing junction having a plurality of inputs. An oscillator provides a signal of a first polarity on one input of the summing junction. A control means provides a signal of the first polarity and representative of a control function on a second input of the summing junction. The summing junction algebraically adds the input signals and operates a trigger to produce a pulse, the time duration of which pulse is dependent on the resultant signal derived by the summing junction. A D.C. power switch is responsive to the pulse for controlling a D.C. load. A current limiter is connected to the switch to impress a signal on the summing junction of an opposite polarity to the first polarity. According to one feature, a load sensor is connected to the D.C. load and to a fourth input of the summing junction to impress a signal on the junction representative of the condition of the load.

---

This invention relates to a control system and method for controlling a D.C. or universal load device, such as a D.C. motor, or an A.C./D.C. motor, respectively.

Motor control systems for electrically driven vehicles, such as golf carts, fork lifts, and the like, generally comprise a current-limiting resistor operated by the accelerator control of the vehicle in series with the D.C. motor. Since the motor is essentially a reactive load, high currents are drawn through the current limiting resistor from the battery or D.C. supply, especially at starting and at lower speeds in its speed range. This frequently overloads the battery and materially reduces the life thereof. In this class of prior art circuit, when the accelerator pedal is suddenly depressed, high currents are impressed through the motor, to cause a sudden increase in the motor speed, thereby causing the motor to exert a large torque upon the driving wheels of the vehicle to spin the wheels. In the case of golf carts, such spinning cannot only cause damage to the turf of a golf course, but can also cause undue stresses upon the motor which at least overloads the battery, and which can even shear off the vehicle's axle. In devices such as fork lifts, gear trains and the like may be damaged or broken.

An object of the present invention is to provide an efficient control system for controlling a D.C. or universal load device which prolongs the life of the D.C. supply or battery, reduces stresses and overloading of the device, and increases the operational safety of the device which it controls.

The control system of the present invention generally comprises a summing junction having an output and a plurality of inputs. A trigger means is connected to the output of said summing junction. The output of the trigger means is connected to a power switch means which connects a D.C. power source to the load device.

An oscillator is connected to one of the inputs of the summing junction to provide a first signal thereto, and a control means is connected to a second one of said plurality of inputs of said summing junction to provide a second signal thereto.

The signals are added at the summing junction to derive a resultant signal, and said trigger means responds to said resultant signal to control said power switch means.

An optional and desirable object of the present invention is to provide a tailoring means connected to said load device for compensating for differences between the effective load line of said power switch means and the effective load line of said load device to prevent over-loading the power switch means.

Another optional and desirable object of the present invention is to provide a load sensor for sensing the condition of the load device providing a third input to said summing junction to further control the power switch means.

Another optional and desirable object of the present invention is to provide a current limiting means for limiting current through said power switch means to appropriate and safe levels.

The present invention, although hereinafter described for controlling a D.C. or universal motor, is fully applicable for controlling any type of D.C. or universal load device. For example, the present control system may be used for controlling electrical arc welding machines and electric grappling machines, as further examples.

It is understood that the term "universal load device," as used hereinafter, refers to any load device capable of operating on either A.C. or D.C. It is further understood that the term "D.C. load device," as used hereinafter, refers to any load device especially designed for D.C. operation as well as any universal load device capable of operating on D.C.

The above and other features of this invention will be fully understood from the following detailed description and the accompanying drawings, in which:

FIG. 1 shows a block diagram of the entire system of the present invention incorporating several of the optional features;

FIG. 2 shows a circuit diagram of the basic system of FIG. 1 with some optional features incorporated therein;

FIG. 3 shows a circuit diagram of an optional time delay circuit for the load control of FIGS. 1 and 2;

FIG. 4 shows an optional control system operating from a tachometer for incorporation into the circuits of FIGS. 1 and 2;

FIG. 5 represents the input signal to a summing junction in FIGS. 1 and 2;

FIG. 6 represents the current through a motor load device in FIGS. 1 and 2; and

FIG. 7 represents the load-lines of a motor and power switch of FIGS. 1 and 2.

Referring to the drawings, FIG. 1 shows a summing junction 10 having inputs at 11, 12, 13 and 14. An output 15 is provided from the summing junction to trigger 16 having an output 17. The signal on line 17 is impressed on an inverter amplifier 18 and from there sent via line 19 to an amplifier 20. Line 21 provides a signal from the amplifier 20 to the power switch 22. The signal from the power switch is fed via line 23 to a forward and reverse control circuit 24 and from there via line 25 to a load device 26, such as a D.C. or universal motor. A load-line tailoring network 27 may be provided to compensate for variations in the load-lines of the load 26 and the power switch 22, and is connected to the load via line 28.

An oscillator 29 provides a signal via line 30 to an inverter amplifier 31. The output of inverter amplifier 31 is connected to the input line 11 of the summing junction 10.

A load control circuit 32 provides a signal via line 33 to a time-delay circuit 34 which provides an output via line 12 to the summing junction 10. Alternatively, as noted hereinafter, time-delay circuit 34 may be omitted where it is desirable not to delay the signal from control circuit 32.

A current limiter circuit 35 provides an output over line 13 to the summing junction 10.

A load sensor 36 may be connected as shown by dashed lines 37 to the load device 26 by any suitable means. The sensor may be any suitable monitoring device for monitoring the operation of the load device. For example, where the load device is a D.C. or universal motor, the sensor may be a suitable tachometer. Dashed lines 37 represent electrical, magnetic, or mechanical connections between the tachometer 36 and the load 26, whereby a condition at the load, such as its speed or some other determinative property, is indicated to the load sensor, which in turn generates a signal. The generated signal is applied as an output over line 38 to a sensor amplifier or signal converter 39. The output of the amplifier is applied through line 14 to the summing junction 10.

Referring to the circuit diagram of FIG. 2, terminals 40, 41 and 42 are adaptable to be connected to a source of D.C. current; such as a battery. As exemplary values, terminal 40 may be connected to positive 36 volts, terminal 41 may be connected to positive 30 volts and terminal 42 may be connected to ground or zero volts. Terminal 40 is connected via line 43 to a copper bar 44. The opposite side of said copper bar is connected via line 45 through a resistor R1 to a line 47. As will be seen hereinafter, bar 44 is adapted to carry large currents. Resistor R1 is provided to limit the currents to the circuitry supplied by line 47.

Terminal 42, which may be grounded as desired, is connected via line 48 to a switch SW1, the function of said switch to be described hereinafter. One primary contact of switch SW1 is connected to line 49. Line 50 is connected to line 49, and a filter capacitor C1 is connected between lines 47 and 50.

Oscillator 29 provides a sawtooth wave function and comprises a unijunction transistor Q1 and resistors R3 and R4 in series across lines 47 and 50. A resistor R5 and capacitor C2 are serially connected across lines 47 and 50 with their junction connected to the control electrode of transistor Q1.

Lead 30 connects the control electrode of transistor Q1 to the base of an NPN transistor Q2 in the inverter amplifier 31. A resistor R6 connects the collector of transistor Q2 to lead 47, while a resistor R7 connects the emitter of transistor Q2 to lead 50. Resistor 27 forms a negative feedback path for transistor Q2 so that amplifier 31 is of the negative feedback type. A resistor R8 connects the collector of transistor Q2 to lead 11, which forms one input of the summing junction 10.

The output of the summing junction 10 is provided over lead 15 to the base of transistor Q3 of the Schmitt trigger 16. Schmitt trigger 16 comprises two PNP transistors Q3 and Q4 having their emitters connected together, and connected to line 47 through resistor R9. The collector transistor Q3 is connected through resistor R10 to lead 50, while the collector of transistor Q4 is connected through resistor R11 to lead 17. The collector of transistor Q3 is further connected to the parallel combination of resistor R12 and capacitor C3 to the base of transistors Q4 and through resistor R13 to lead 47.

Lead 17 is connected to the base of NPN transistor Q5 which forms an inverter amplifier 18. The emitter of transistor Q5 is connected to lead 49, while the collector of transistor Q5 is connected to lead 19.

The signal on lead 19 is preferably amplified by a two-stage amplifier 20 which comprises transistors Q6 and Q7. Lead 19 is connected to the base of PNP transistor Q6 and to a resistor R14, the other side of which is connected to lead 45. The emitter of transistor Q6 is connected to the base of PNP transistor Q7 and to a resistor R15 which is connected to lead 45. The emitter of transistor Q7 is connected to lead 21 to provide a signal to the output power switch 22 and through a resistor R16 to lead 45. The collector of transistor Q6 is connected through a resistor R17 to lead 51; while the collector of transistor Q7 is connected to lead 23.

The power output switch 22 comprises a copper bar 44 conducting between leads 43 and 45. Copper bar 44 serves to conduct high currents and may, for example, be a 300 ampere bar. Resistors R18 through R25 are connected to the copper bar 44 in equal distances with their opposite ends connected to the emitters of PNP power transistors Q8 through Q15, respectively. The number of power transistors used may vary according to the particular application, but in the example presented it is favorable to have one transistor for each 40 amperes along copper bar 44. Resistors R18 through R25 are preferably small, for example, 0.003 ohm at 10 watts, and serve to compensate for manufacturing differences between transistors Q8 through Q15.

The bases of the transistors Q8 through Q15 are connected in parallel to lead 21. The collectors of transistors Q8 through Q15 are connected to an aluminum bar 52. A small resistor R26 is preferably connected between the aluminum bar 52 and lead 23. Resistor R26, which may have a value of approximately 0.001 ohm at 20 watts, approximates the resistance of the emitter-base junction of transistor Q7 for proper matching to the power transistors.

A forward and reverse control circuit 24, which is desirable in applications where said load is a motor or the like, includes a switch SW1 having primary contacts 53, 54 and 55. Contact 53 is connected to lead 49 and has secondary contacts 56 and 57. Contacts 56 and 57 are both connected to the zero or ground lead 48. Contact 54 has two secondary contacts 58 and 59, both connected to a lead 60 which connects to terminal 41, which, as noted above, may be connected to positive 30 volts. Contact 54 is connected to lead 51 to provide a six-volt supply between leads 45 and 51 to the amplifier 20. The winding 60 of a safety relay is connected between leads 59 and 51 through a switch SW2; the function of said relay will be described hereinafter.

Upon energization of the winding 60, normally-open relay contacts 61 close connecting primary contact 55 to switch SW1 to lead 51. Secondary contacts 62 and 63 are adapted to mate with primary contact 55.

Contact 62 is connected to relays 64 and 65 via line 66. Contact 63 is connected to relays 67 and 68 via lead 69. The opposite sides of relays 64, 65, 67 and 68 are connected to the zero or ground lead 48. Relays 64 and 67 control a primary contact 70 having two matable contacts 71 and 72; while relays 65 and 68 control a primary contact 73 having two matable contacts 74 and 75. Contacts 71 and 74 are connected together through a field winding F for the D.C. or universal motor to the zero or ground lead 48; while contacts 72 and 75 are connected together to lead 23 from the power switch.

Switch SW1 is a three-position switch and having a central "off" position. When in the center position, the primary contacts 53, 54 and 55, not being connected to any source of power, cause the entire circuit to be in an "off" condition. When in either a first position (shown upward in FIG. 2) or a second position (shown downward), contacts 54 and 53 will be connected to leads 60 and 48, respectively, supplying 30 and zero volts of power to leads 51 and 49, respectively.

When switch contact 55 is mating contact 62, relays 64 and 65 will be energized causing contact 70 to mate with contact 71 and contact 73 to mate with contact 75; and when contact 55 is mating contact 63, relays 67 and 68 will be energized causing contact 70 to mate with contact 72 and contact 73 will mate with contact 74. Thus contact 55 controls the forward and reverse direction of the motor shown as M.

A diode D7 is connected between leads 48 and 23 to compensate for back E.M.F. of the motor M.

The velocity or load control circuit 32 includes a variable resistor R27 connected between lines 49 and 33.

Another variable resistor R28 is connected between lines 33 and 45. Lead 33 is connected to a terminal A of block 34, the output of which is connected to terminal B through resistor R29 to lead 12. Terminal C is connected to lead 49. Block 34 is a load control time-delay circuit which may be optionally incorporated into the system.

The time-delay circuit 34 is shown in FIG. 3 as having terminals A and B connected through the parallel combination of a diode D1 and a resistor R30. Terminal B is also connected through capacitor C4 to terminal C. Time-delay circuit 34 is optional, and if not used, terminals A and B are short-circuited and terminal C is left open.

A current limiting circuit is shown at 35 having output lead 13 to the summing junction 10. A lead 76 is connected to junction between copper bar 44 and resistor R18. A lead 77 is connected to the junction between resistor R18 and the emitter of transistor Q8 and connects to the emitter of transistor Q16. To prevent induction of stray currents into leads 76 and 77, it is preferred that these leads be twisted from the power switch to the current limiter circuit.

Although leads 76 and 77 are shown connected across resistor R18, it is understood that they may be connected across any of the resistors R18 through R25. As shown in the specific embodiment, the power switch 22 has eight power transistors therein. Thus the current flowing through said power switch is divided into eight equal paths through each of resistors R18 through R25. The signal across leads 76 and 77 thus represents one-eighth of the signal through the power switch. In this manner, the power switch acts as a current divider and provides a simple current to the current limiter 35.

The collector of transistor Q16 is connected to lead 50 through a resistor R31. Lead 76 is connected through the serially connected resistors R32, R33 and R34 to lead 50. The base of transistor Q16 is connected to the junction between resistors R32 and R33. A pair of diodes D2 and D3 are connected across resistors R32 and R33. Diodes D2 and D3 act as a 1½ volt Zener diode to provide a bias voltage to the point between resistors R33 and R34 to provide a sufficient base current for transistor Q16. Resistor R33 is variable to reduce that voltage to finely adjust the current limiter. A capacitor C5 is connected across resistor R31 through diode D4. The junction between diode D4 and capacitor C5 is connected to lead 13 of the summing junction 10 through diode D5.

The operation of the circuit thus far described is as follows: The D.C. source is connected through resistor R1 across filter capacitor C1. The filter capacitor serves to maintain a constant source of direct current for the oscillator 29, the inverter amplifier 31, the summing junction 10, and the Schmitt trigger 16. The unijunction transistorized oscillator 29 generates a sawtooth-type wave and impresses this via line 30 on the inverter amplifier 31. The output from the inverter 31 is impressed on line 11 to the summing junction 10 and is represented by waveform 78 in FIG. 5. At the same time, the control circuit 32 provides a signal to bias the sawtooth waveform 78. The trigger level for the Schmitt trigger is represented by line 79 in FIG. 5 and is of a lower value than the normal value of the peak of waveform 78.

In applications where the control circuit is used for controlling a D.C. or universal motor, resistor R27 in the control circuit 32 may be utilized for controlling the velocity range of the motor. As resistor R27 is decreased, the signal impressed via line 12 to the summing junction 10 becomes less positive. As the signal on lead 12 becomes less positive, the signal 78 from the inverter is biased more negatively due to the analog adding of the signals on leads 11 and 12 at the summing junction. Thus, the peak of sawtooth waveform 78 approximates the threshold level of the trigger, as indicated by dotted lines 80 in FIG. 5. The velocity control resistor R28, sometimes hereinafter referred to as an accelerator control resistor, may then be decreased to place a more positive signal on lead 12 to the summing junction 10 to positively bias the sawtooth waveform.

The Schmitt trigger 16 produces a pulse of constant amplitude whose width is dependent upon the length of time that the sawtooth wave has exceeded the trigger level of the trigger. It can be seen that by regulating resistors R27 and R28, the width of the pulse from the Schmitt trigger will be increased or decreased as desired.

The pulse output from the Schmitt trigger 16 is impressed through the inverter amplifier 18 and amplifier 20 to the base elements of the power transistors Q8 through Q15, causing the power transistors to be switched to their on, or conducting, state during each pulse output from the Schmitt trigger. The length of time that the power transistors are conducting is thus dependent upon the length of time that the sawtooth wave 80 in FIG. 5 has exceeded the trigger threshold level 79.

In practice, resistor R27 is adjusted, prior to operation, to select a maximum velocity for the motor. The operator may then adjust the velocity control resistor R28 to bias the sawtooth waveform to obtain various periods of time that the power transistors conduct. The velocity of the motor is thus regulated by the percentage of the time that the power transistors conduct.

In FIG. 6, dashed lines 81 represent the positive output from the Schmitt trigger 16 (it being realized that this signal will be inverted by inverter 18 for proper polarity to the bases of the power transistors Q8 through Q15). A positive signal, represented by waveform 82, is developed across resistor R18 in FIG. 2 for connection to the current limiter 35. This waveform takes on its peculiar shape due to the reactive load of the D.C. or universal motor.

Waveform 82 is initially a sharp rise due to the capacitive reactance in the motor followed by a sloping rise due to the inductive reactance of the motor. The peak of waveform 82 thus occurs at the trailing edge of each pulse. The waveform 82 is representative of the actual current being drawn through the transistors Q8 through Q15.

It may occur that for short periods of time the peak level of signal 82 may exceed the rated peak levels of transistors Q8 through Q15 as represented by line 83 in FIG. 6. Current limiter 35 is designed to automatically compensate for such occurrences.

During normal operation, transistor Q16 in current limiter 35 is biased to its on, or conducting, state by resistor R33.

However, when the signal 82 exceeds the rated maximum for transistors Q8 through Q15, the emitter of transistor Q16 is forced negative to cut off transistor Q16. While transistor Q16 is off, negative current is permitted to flow from line 50 through resistor R31 and diodes D4 and D5 to lead 13, which forms one input to the summing junction. Due to the analog adding of signals at the summing junction, the negative signal on lead 13 tends to bias the sawtooth waveform 78 from the inverter 31 to a less positive value causing the waveform 78 to exceed the trigger level 79 for a shorter period of time, thus causing the pulses derived by trigger 16 to have a smaller time duration, shortening the width of waveform 82 at its trailing edge, causing the peak of waveform 82 to stay within the limit 83 of transistor Q8 through Q15.

During normal conditions, transistor Q16 is conducting, causing the negative signal from the current limiting device to be cut off, removing the negative bias from the sawtooth waveform 78.

Capacitor C5 is constantly discharging through resistor R31 and serves to smooth the output from the current limiter.

The load-line for the transistors Q8 through Q15 is represented by line 85 in FIG. 7. As long as the load device provides a load within the area beneath line 85 in FIG. 7, the transistor ratings will not be exceeded. However, a reactive load such as a D.C. or universal motor having a load-line as indicated by dashed line 86 in FIG. 7 may exceed the transistor rating for short periods of time.

The load-line of such a reactive load is initially a slow decrease due to the capacitive reactance in the motor followed by a sharp decrease due to the inductive reactance in the motor. As indicated by area 87, a substantial amount of operation of the motor may occur beyond the load-line 85 of the transistors Q8 through Q15. It is therefore desirable to overcome the reactive type load-line and bring the entire load-line within load-line 85 of the transistors.

To lower the load-line of the reactive load to a value indicated at 88 in FIG. 7, a tailoring device 27 is connected between lead 40 and lead 23. The tailoring device comprises a diode D6 in series with the parallel combination of resistor R35 and capacitor C6. Excessive energy, such as shown in area 87 in FIG. 7, is dissipated through diode D6 and stored in capacitor C5 which, in turn, is allowed to discharge through resistor R35.

Another feature of the present invention is the optional provision of sensing means for sensing the condition of the load, and supplying a negative signal to the summing junction 10 when the load is operating above its desired level, such as might occur when the motor causes the drive wheels to spin. An example of such an arrangement is shown in FIG. 4 wherein a tachometer 36 senses the condition of a D.C. or universal motor, and a diode bridge 89 insures correct polarity connection of a negative signal from the tachometer to the amplifier 39. The positive side of the diode bridge 89 is connected to the positive 36 volt source on lead 45, while the negative side of the bridge is preferably connected through an amplifier 39 to two variable resistors R36 and R37.

Resistor R36 connects to a secondary contact 90 of switch SW3, while resistor R36 connects to the secondary contact 91 of the same switch. Primary contact 92 is connected through diode D8 to lead 14, and through the parallel combination of capacitor C7 and resistor R38 to lead 45. Switch SW3 is preferably a three-position switch having a central "off" position. Preferably, primary contact 92 operates in unison with the primary contact of switch SW1.

The tachometer is normally generating a signal representative of the speed of the motor. However, if the motor increases in speed beyond a preselected amount, such as by excessive speed or by allowing the drive wheels of the vehicle to spin, the tachometer generates a higher signal due to the higher speed of the motor. When this signal exceeds the voltage at the summing junction, a negative signal, representative of the excess of that voltage, is fed via line 14 to the summing junction to reduce the bias of the sawtooth wave. The negative signal on line 14 thus reduces the signal through the summing junction 10 to the Schmitt trigger 16 causing a narrower pulse output from the Schmitt trigger. The power switch means 22 thus delivers less power to the motor in a manner hereinbefore described.

Alternatively, where it is desired to sense and compensate for situations where the load is operating below a desired level, the sensing means may provide a positive signal to further enhance the sawtooth waveform at the summing junction 10 and cause the power transistors to deliver more power to the load device to bring it up to the desired level.

With the load device being a D.C. or universal motor, the operation is essentially as follows: Switch SW1 is moved to a first position so that primary contact 53 contacts secondary contact 57, primary contact 54 contacts secondary contact 59, and primary contact 55 contacts secondary contact 63. Current is supplied to the oscillator 30 to provide a sawtooth waveform such as 78 in FIG. 5 to the input of the Schmitt trigger 16. The operator then depresses the accelerator pedal (not shown) causing a positive bias to be placed on lead 12 to the input of the summing junction 10.

At the same time, switch SW2, which is connected to the accelerator pedal, closes energizing safety relay 60. Relay contact 61 closes, energizing relay windings 67 and 68 through secondary contact 63 of switch SW1. Primary contact 70 engages secondary contact 72 while primary contact 73 engages secondary contact 74 allowing a current path from lead 23 through contacts 72 and 70, motor M, contacts 73 and 74 to field winding F to lead 48. The motor thus begins to turn in a first, or forward, direction. The operation of the current limiter 35 and the load-line tailoring network 27 then operate on the summing junction in analog fashion as hereinbefore described.

At the same time that the primary contacts of switch SW1 are moved to their first position, primary contact 92 of switch SW3 is moved to its first position engaging secondary contact 90. The tachometer 36 may provide a negative signal limited by resistor R36 for connection into the input of the summing junction 10 as hereinbefore described.

Upon releasing the accelerator pedal, switch SW2 is opened causing relay winding 60 to be de-energized, opening contact 61. Power is thus removed from the relay windings 67 and 68 causing contacts 70 and 73 to open circuit. Thus the motor is removed from the circuit causing it to stop.

In case the operator moves the accelerator to its fully depressed position more rapidly than may be suitable, delay circuit 34 delays the signal from the accelerator resistor R28 to lead 12. Capacitor C4 in the time delay circuit 34 serves to store the voltage from the accelerator control 32. Thus a sudden surge from the accelerator control 32, such as would occur upon rapidly decreasing resistor R28 to its minimum value, would pass through resistor R30 and dissipate into capacitor C4. Capacitor C4 will thus slowly build up the charge and dissipate it through resistor R29 in FIG. 2 to lead 12.

Upon release of the accelerator pedal, diode D1 allows a direct connection to lead 12 so the effect of increasing resistor R28 immediately results in decreasing the signal to the trigger 16.

If the operator desires to run the motor in the opposite, or reverse, direction, switch SW1 is moved to its second position so that primary contact 53 contacts secondary contact 56, primary contact 54 contacts secondary contact 58, and primary contact 55 contacts secondary contact 62. Thus, when the accelerator switch SW2 is closed, relay winding 60 energizes closing contact 61 to provide power to relay windings 64 and 65 causing primary contact 70 to engage secondary contact 71 and primary contact 73 to engage secondary contact 75. Power is thus supplied to the motor from the power switch 22 through lead 23, contacts 75 and 73, motor M, contacts 70 and 71, the field winding F to lead 48. At the same time, switch SW3 is moved to its second position so that primary contact 92 engages secondary contact 91, providing a negative signal through resistor R37 to lead 14.

By setting different values of resistance on variable resistors R36 and R37 in FIG. 4, a different negative signal is available to lead 14 to the summing junction 10. Thus if resistor R37 is set in a higher resistance than resistor R36, a higher negative signal will be available on lead 14 for the reverse direction than will be available in the forward direction. Thus, in spite of the operator setting of the accelerator control resistor R28, the motor will move at a slower velocity in the reverse direction than in the forward direction.

The use of the load sensing circuit of FIG. 4 is particularly advantageous where the load may be subjected to abuse. For example, the driving wheels of a vehicle may be intentionally or inadvertently allowed to slip or spin. With the tachometer arrangement shown in FIG. 4, the negative signal on line 14 from the tachometer circuit is increased when the motor speed increases (due to slippage of the wheels) causing the Schmitt trigger to receive a smaller input amplitude. Thus, the trigger passes pulses of less time duration causing a smaller amount of power being delivered to the motor. The motor is therefore freed from damage from even intentional abuse.

The following parts list is given by way of example of a circuit according to the present invention which has been constructed.

| Transistors: | Number |
| --- | --- |
| Q1 | 2N2160 |
| Q2, Q5 | 2N3417 |
| Q3, Q4 | 2N1373 |
| Q6, Q16 | 2N1039 |
| Q7 | 2N511B |
| Q8–Q15 | MP505 |
| Diodes: | |
| D1, D8 | 1N498 |
| D2–D5 | 1N483A |
| D6 | MR1200FLR |
| D7 | MR1200FL |
| Capacitors | Microfarads |
| C1 | 20 |
| C2 | 1 |
| C3 | 0.0001 |
| C4 | 50 |
| C5, C7 | 0.01 |
| C6 | 1000 |
| Resistors: | Ohms [1] |
| R1 | 10, at 5 w. |
| R3 | 30K. |
| R4 | 27. |
| R5 | 100K. |
| R6, R10, R11 | 2K. |
| R7, R32 | 50. |
| R8, R12, R29 | 10K. |
| R9 | 520. |
| R13 | 18K. |
| R14 | 100, at 1 w. |
| R15 | 10, at 2 w. |
| R16 | 1, at 10 w. |
| R17 | 3, at 10 w. |
| R18–R25 | 0.003, at 10 w. |
| R26 | 0.001, at 20 w. |
| R27 | 1K (variable). |
| R28 | 5K (variable). |
| R30, R36, R37 | 10K (variable). |
| R31 | 500, at 1 w. |
| R33 | 50 (variable). |
| R34 | 1K, at ½ w. |
| R35 | 0.5, at 50 w. |
| R38 | 5K. |

[1] At ¼ watt unless specified.

Although the present invention has been described using PNP and NPN transistors for amplification and switching purposes and a unijunction transistor for the oscillator, it is understood that other semiconductor devices, vacuum tubes and magnetic core devices may be used for the same purpose. Likewise, PNP transistors may be substituted for NPN transistors, and NPN transistors may be substituted for PNP transistors. Likewise, other semiconductor devices, such as silicon controlled rectifiers, silicon controlled switches, etc., may be used for the specific elements shown. A suitable Zener diode may be used for diodes D2 and D3 as hereinbefore mentioned.

The present invention thus provides a control circuit for controlling D.C. and universal load devices, such as D.C. motors and the like, which is economical, less likely to be damaged from abuse, and is highly reliable. Battery life is extended and maintenance is minimal when the present control system is utilized.

This invention is not to be limited by the embodiments shown in the drawings and described in the description, which is given by way of example and not of limitation, but only in accordance with the scope of the appended claims.

We claim:
1. A control system for controlling a D.C. load device comprising: a summing junction; a plurality of inputs for said summing junction; an oscillator means connected to a first one of said plurality of inputs for producing a first signal having an amplitude of a first polarity; a control means connected to a second one of said plurality of inputs for producing a second signal having an amplitude representative of a control function and a polarity the same as the said first polarity; the signal amplitudes at said plurality of inputs being added in analog manner at the said summing junction to derive a resultant signal having an amplitude dependent upon the algebraic sum of the input signal amplitudes; trigger means responsive to said resultant signal for producing a pulse having a time duration dependent upon the amplitude of said resultant signal; a power switch means responsive to said pulse for connecting a D.C. power source to said load device during the duration of said pulse, said power switch means including a current dividing means; and a current limiter means, said current limiter means having an input connected to said dividing means and having an output connected to a third one of said plurality of inputs of said summing junction to provide a third signal thereto which third signal has an amplitude and a second polarity opposite from said first polarity; said current limiter means comprising a transistor having a base, a first electrode and a second electrode, means connecting said first electrode to a first point of said dividing means, means connecting said second electrode to said third one of said plurality of inputs of said summing junction, a voltage regulating diode and a resistor connected in parallel, means connecting said diode and resistor to a second point of said dividing means, and means connecting said base to said resistor.

2. Apparatus according to claim 1 wherein said load device controls a load sensor having an output connected to a fourth one of said plurality of inputs of said summing junction to provide a fourth signal thereto which fourth signal has an amplitude and polarity representative of a load device condition.

3. Apparatus according to claim 2 wherein said load device has a first effective load-line and said power switch means has a load-line, and tailoring means for reducing the first effective load-line of said load device to a second effective load-line by dissipating electrical energy from said load device.

4. Apparatus according to claim 1 wherein said load device is a D.C. motor and said control means is an accelerator control means.

5. Apparatus according to claim 4 wherein said motor may be rotated in either of two directions and in which a first switching means is connected between said power switch means and said motor for controlling the direction of rotation of said motor.

6. Apparatus according to claim 5 wherein an additional means is controlled by said accelerator control means for selectively connecting said first switching means to said motor.

7. Apparatus according to claim 4 wherein said motor has a first effective reactive load-line and said power switch means has a load-line, a capacitive tailoring means for reducing the first effective load-line of said motor to a second effective load-line by dissipating electrical energy from said motor.

8. Apparatus according to claim 7 wherein said motor drives a tachometer for sensing motor speed having an output connected to a fourth one of said inputs of said summing junction to provide a fourth signal thereto which fourth signal has an amplitude and polarity representative of the motor speed.

9. Apparatus according to claim 8 wherein said motor may be rotated in either of two directions and in which a first switching means is connected between said power switch means and said motor for controlling the direction of rotation of said motor.

10. Apparatus according to claim 9 further including means for limiting the amplitude of said fourth signal and in which said first switching means includes means for selectively varying said means for limiting the amplitude of said fourth signal.

11. Apparatus according to claim 9 further including connecting means controlled by said accelerator control means for selectively connecting said first switching means to said motor.

12. Apparatus according to claim 4 wherein said motor drives a tachometer for sensing motor speed having an output connected to a fourth one of said inputs of said summing junction to provide a fourth signal thereto which fourth signal has an amplitude and polarity representative of the motor speed.

References Cited
UNITED STATES PATENTS

| | | | |
|---|---|---|---|
| 3,213,343 | 10/1965 | Sheheen | 318—345 |
| 3,260,912 | 7/1966 | Gregory | 318—345 |

ORIS L. RADER, Primary Examiner

K. L. CROSSON, Assistant Examiner

U.S. Cl. X.R.

318—260, 345, 434